June 4, 1963   E. KUHNLE ET AL   3,092,199
SCALE
Filed March 15, 1961
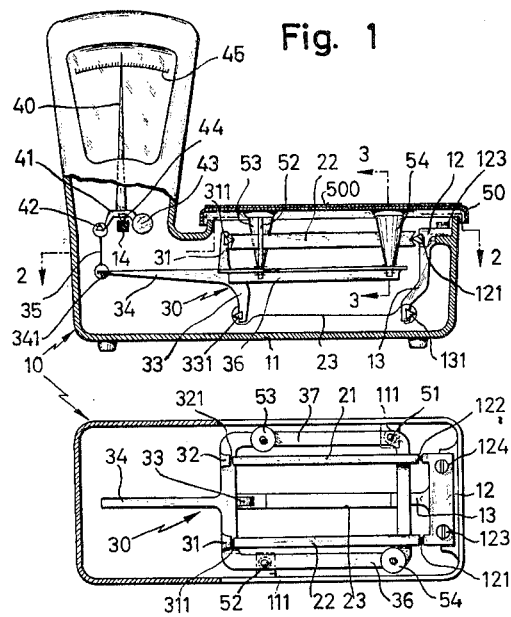
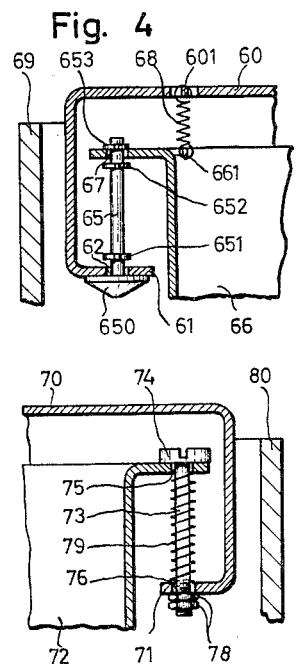
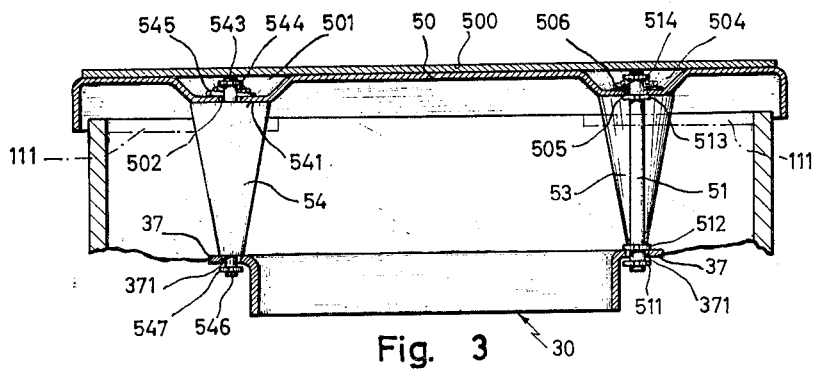
BY *Nolte and Nolte*
ATTORNEY 3,092,199
SCALE
Ernst Kuhnle and Josef Schwarz, Balingen, Wurttemberg, Germany, assignors to Bizerba-Werke Wilhelm Kraut KG., Balingen, Wurttemberg, Germany
Filed Mar. 15, 1961, Ser. No. 95,936
Claims priority, application Germany Aug. 23, 1960
7 Claims. (Cl. 177—255)

The present invention relates to a scale and in particular to a scale having a weighing platform which is supported by a frame guided parallel to itself by a system of parallel arms.

In scales of small capacity, the transmitting lever system is frequently replaced by a frame which supports the platform and is guided parallel to itself by pressure and tension arms.

In known scales of this type, the weighing platform is connected to the parallel-guided frame by rigid posts. It is a disadvantage of this type of mounting that shocks to the weighing platform are directly transmitted to the system of parallel arms, which results in damage to the weighing mechanism. This occurs for instance during the transport of the scale. It is a further disadvantage of the rigid connection of the weighing platform to the frame, that the movable frame may be easily put under stress when the weighing platform is connected thereto for instance by riveting or screwing. This has a detrimental effect on the characteristic of the scale, on its mobility and on its accuracy.

According to the present invention, these disadvantages are overcome by connecting the weighing platform to the frame through supports which are tiltable in all directions, the tilting motion being limited by stationary stops. At least two of these tiltable supports have contacting areas which are urged by springs towards opposing area; the edges of these contacting areas constitute the loci for points that serve as pivot points for tilting of the supports, their centers are provided with pins which have a cross section smaller than the contacting areas.

In one embodiment the springs returning the mechanism to its initial position are conical compression springs, the smaller end of which engages the end of the pin.

In another embodiment the supports are cap screws. The large heads of these screws form the contacting areas, their shafts are surrounded by compression springs, and they are secured at their ends by lock nuts.

In another embodiment, the supports are bolts. The large underside of the heads of the bolts form the contacting area. At one end these bolts are axially held, and their other end is secured. Tension springs are inserted between the weighing platform and the frame.

It is an object of the present invention to provide a scale having a frame moving parallel to itself under load and a weighing platform supported by this frame, in which the weighing platform and the frame do not form a rigid unit but are relatively movable momentarily under excessive external forces, and then restore themselves to original relative positions.

It is another object of the present invention to provide a scale having a frame moving parallel to itself under load and a weighing platform support by this frame, which scale is rugged and can withstand shocks.

It is still another object of the present invention to provide such a scale which has a good operational characteristic and high accuracy.

Further features and advantages of the present invention will become apparent from the following specification and the accompanying drawings, in which:

FIG. 1 is a front view partly in section of a scale according to the present invention;

FIG. 2 is a top view of the scale shown in FIG. 1 with the weighing platform removed, as indicated by the line 2—2 in FIG. 1;

FIG. 3 is an enlarged section along the line 3—3 of FIG. 1, omitting the elements of the system of parallel arms and of the indicator, and showing other features in better detail;

FIGS. 4 and 5 are sectional views illustrating two different embodiments, respectively, of the connection between the weighing platform and the frame.

Referring now to the drawings, and particularly to FIGS. 1 and 2, a housing 10 for a scale is provided with a bottom 11. A movable frame 30 is held between a system of parallel arms, i.e., pressure arms 21, 22 and tension arms 23. The frame 30 moves parallel to itself in a vertical direction when loaded.

The two pressure arms 21 and 22 rest with one end on knife edges 121 and 122 of a bearing block 12 which is screwed to the housing 11 with screws 123 and 124. The other ends of pressure arms 21 and 22 rest on knife edges 311 and 321 of bearing blocks 31 and 32 secured to the movable frame 30. The tension arm 23 is held between a knife edge 131, on an arm 13 depending from the bearing block 12, and a knife edge 331 on an arm 33 depending from the movable frame 30.

The displacement of the movable frame 30 is transmitted by a transmitting arm 34 and a tension rod 35 arranged between knife edges 341 and 42 to an indicator 40. The deflection of the indicator 40 can be read on a scale 45. The indicator 40 rests with its knife edge 44 on a stationary bearing 14.

The indicator 40 carries at its supported end an inclination lever 41 which has a knife edge 42 and an inclination weight 43.

The movable frame 30 carries four upwardly extending supports which define a rectangle and support the weighing platform 50 which is covered by a plate 500. Two of the supports are circular cylinders, while the two others are truncated cones with the larger bases directed upwardly. The two supports of each pair are arranged diametrically opposite to one another.

Referring now to FIG. 3, the larger base 541 of the truncated cone support 54 abuts the underside of the bottom of a dish-shaped depression 501 in the weighing platform 50. A pin 543 in the axis of symmetry of the truncated cone support 54 penetrates through a bore 502 in the center of the depression 501; the diameter of the bore 502 is larger than the diameter of the pin 543.

A snap ring 544 engages an annular groove at the upper end of the pin 543, and a conical spring 545 abuts against the snap ring 544 with its smaller end. The larger end of the conical spring 545 rests on the bottom of the disk-shaped depression 501.

The lower smaller end of the truncated cone support 54 rests on an arm 37 of the frame 30. This end of the support 54 has a pin 546 which extends through a bore 371 having a larger diameter than the pin 546. In the vicinity of the end of the pin 546 is an annular groove which accommodates a snap ring 547. There is free motion between the snap ring 547 and the arm 37 of the frame 30 to permit tilting of the support 54. The spring 545 stores energy during the tilting motion, which energy is released as the spring 545 restores the support 54 to its untilted position. The conical support 53 is designed and mounted similar to the support 54.

The other pair of supports, rods 51 and 52, which connects the weighing platform with the arms 37 of the frame 30, are circular cylinders. At their ends are pairs of spaced snap rings 511, 512 and 513, 514, respectively; the spacing between the snap ring pairs on each rod 51 and 52 is larger than the thickness of the arm 37 to permit a small amount of free or lost motion.

The upper end of the support 51 extends through a bore 505 in the bottom of a dish-shaped depression 504 of the weighing platform 50; the bore diameter is larger than the diameter of the support 51. The larger end or base of a conical spring 506 rests on the bottom of the dish-shaped depression 504, the smaller end of the conical spring 506 abutting against the snap ring 514 so that the conical spring 506 urges the dish 504 and weighing platform 50 towards the snap ring 513. The snap ring 512 of the support 51 rests on the arm 37 of the frame 30; the support 51 extends through a bore 371 of the arm 37 of the frame 30. The support 52 is constructed and mounted similarly to the support 51.

The different embodiments illustrated in FIGS. 4 and 5 show different mountings of the weighing platform.

FIG. 4 illustrates a weighing platform 60 having a depending rim which is turned inwardly at its end as at 61. A bolt 65 having a large head 650 extends through a bore 62 in the bent section 61 of the weighing platform 60. The head 650 of the bolt 65 abuts against the underside of the section 61. A snap ring 651 is arranged in an annular groove of the bolt 65 spaced from the head 650 by more than the thickness of the section 61 of the weighing platform 60.

The upper end of the bolt 65 extends through a large bore 67 in a flange of a frame 66 and carries two snap rings 652 and 653 which are so spaced that they limit the axial displacement of the bolt 65. Snap rings 651 and 652 are positioned to permit free motion so that the bolt 65 can be tilted from its upright position. During the tilting motion of the bolts 65, energy is stored in tension springs 68, which energy is released as the springs 68 restore the bolts 65 to their upright positions.

A tension spring 68 is arranged between the frame 66 and the weighing platform 60; the tension spring 68 is anchored to the weighing platform at 601 and to the frame at 661. The housing of the scale is designated 69.

In the embodiment shown in FIG. 5, the weighing platform 70 is also formed with an inwardly extending rim 71. A cap screw 73 connects the weighing platform 70 with a frame 72. The head 74 of the screw 73 rests on the upper edge of the frame 72; the shaft of the screw 73 extends downwardly through a large bore 75 in the frame 72. The lower end of the screw 73 extends through a large bore 76 in the inwardly extending rim 71 of the weighing platform 70 and is secured by locking nuts below the rim 71.

A helical compression spring 79 surrounds the bolt of the screw 73; the upper end of the spring 79 abuts against the frame 72 and the lower end of the spring 79 abuts against the inwardly extending rim 71 of the weighing platform 70. 80 designates the housing of the scale. In this embodiment the free motion is possible as the spring 79 is compressed, storing energy for the restoring motion.

The mounting of the weighing platform according to the present invention operates as a shock absorber. Shocks may occur for instance during the handling of the scale and particularly during its transportation. The shock absorber protects the sensitive support of the system of parallel arms and the indicator from damage due to shock.

If a force is exerted on the weight platform or on the scale which contains a component in the horizontal plane or in the plane of the weighing platform, the inventive suspension results in a displacement of the weighing platform in the direction of this component, since the mounting of the supports, bolts and screws, respectively, combined with the spacing of the spring rings, permit a tilted position of these connecting elements by pivoting on their edges. The truncated cone, the bolt or the screw are pivoted on a point along the edge of their large contacting periphery. This increases the tension in the associated springs producing a return moment with the pivot as axis which tends to return the supports, bolts or screws to their original positions.

The pivoting movement may be limited for instance by the housing of the scale or various stops 111 (FIGS. 2 and 3) may be provided near the edge of the housing.

It should be understood that the foregoing disclosure relates to preferred embodiments of the invention, and that it is intended to cover all changes and modifications of the examples described which do not constitute departures from the spirit and scope of the invention as set forth in the appended claims.

What is claimed is:

1. In a scale having a weighing platform guided parallel to itself by a system of parallel arms, connecting means each having a plurality of ends tiltably secured between the weighing platform and the system of parallel arms, at least one end of each of said connecting means having mounting means adapted to tilt said connecting means in any direction about itself, said connecting means normally occupying a stable position and each of said ends being tiltable momentarily to non-stable positions into any one of said directions in response to a sudden force applied to the platform, and being tiltable back to the stable position upon termination of the force.

2. In a scale having a weighing platform and a system of parallel arms, the combination comprising a frame supported by the system of parallel arms to be displaceable parallel to itself, at least two supports each having two ends, one end of each support being normally stably connected to said frame with limited permissible relative adjustment to non-stable position, the other end of each support being similarly normally stably connected to the weighing platform with limited permissible adjustment to non-stable position, one end of each support being formed with a circular face abutting an adjacent area for non-stably pivoting thereon along any point of the circumference of the circular face, and resilient means tending to hold said supports in their stable unpivoted positions.

3. In a scale, the combination defined in claim 2, further comprising stops positioned to limit the pivoting motions of said supports.

4. In a scale, the combination defined in claim 2, in which said supports are shaped as truncated cones, the wider base of said cones forming said circular face abutting an area of the weighing platform and being pivotable thereon, and said resilient means being a conical spring urging said truncated cone towards its unpivoted position.

5. In a scale, the combination defined in claim 2, in which said supports are bolts formed with a large head constituting said circular face, and said resilient means are springs extending between said frame and the weighing platform.

6. In a scale, a combination as defined in claim 2, in which said supports are screws, each having a large head defining said circular area, and said resilient means are compression springs surrounding the shafts of said screws, respectively.

7. In a scale having a weighing platform and a movable frame, the improvement comprising a plurality of parallel means each resiliently connected at one end from said weighing platform and resiliently connected at its other end from said frame, providing for a relative displacement of said platform and frame in all directions.

References Cited in the file of this patent

UNITED STATES PATENTS

| | | |
|---|---|---|
| 1,468,020 | Hem | Sept. 18, 1923 |
| 1,858,795 | Van Duyn | May 17, 1932 |
| 2,523,429 | Hart et al. | Sept. 26, 1950 |
| 3,002,576 | Kuhnle | Oct. 3, 1961 |